Patented July 24, 1934     1,967,220

UNITED STATES PATENT OFFICE 1,967,220

EMULSION

Harold James Barrett and George Lowrance Dorough, Wilmington, Del., assignors to E. I. du Pont de Nemours & Company, Wilmington, Del., a corporation of Delaware No Drawing. Application April 1, 1933, Serial No. 664,024

15 Claims. (Cl. 134—17)

This invention relates to the art of making emulsions and more particularly to emulsions made with a new class of emulsifying agents.

This invention has as an object the preparation of highly stable emulsions with water of liquids immiscible therewith. A further object is to disclose a new type of material as an emulsifying agent. A still further object is the preparation of compositions comprising aqueous emulsions of synthetic rubber and more particularly of chloro-2-butadiene-1,3. Other objects will appear hereinafter.

We have discovered that improved emulsions of water with water insoluble liquids may be made by using polyhydric alcohol-polybasic acid resins, and preferably aqueous solutions of their water-soluble salts, as emulsifying agents. These aqueous solutions, as well known to those skilled in the resin art, are prepared by partially esterifying a polybasic acid with a polyhydric alcohol with or without modifying ingredients, and neutralizing with an aqueous solution of water soluble base such as ammonium or sodium hydroxide. Other acids, as for instance fatty oil acids, may be used with the polybasic acids in the partial esterification of the polyhydric alcohol.

In preparing the emulsions we prefer to use a water solution of the resin salt. This water solution is added to the other immiscible liquid and the mixture subjected to mechanical agitation, as for instance with a high speed stirrer or colloid mill.

A particularly valuable application of our invention is in the preparation of emulsions of chloro - 2 - butadiene - 1,3 (hereinafter termed "chloroprene").

The following example in which the parts given are by weight is an illustration of the method of carrying out the invention.

Example I

To 50 parts of chloro-2-butadiene-1,3 (chloroprene) is added 50 parts of a 2% aqueous solution of the sodium salt of a polyhydric alcohol-polybasic acid resin prepared from the following ingredients:

| | |
|---|---|
| Glycerol | 29.73 |
| Phthalic anhydride | 70.27 |
| | 100.00 | by heating them for one hour up to 200° C., holding at this point for one to one and one-half hours or to an acid number 140-170, and neutralizing the product with a dilute solution of ammonium hydroxide. The mixture of chloroprene and water solution of the resin is stirred five minutes with a high speed stirrer. The chloroprene is reduced to a very small particle size, and a very stable emulsion of chloroprene and water is produced. The emulsion is allowed to stand from 24-72 hours at 0-10° C. or until polymerization is substantially complete; this can be ascertained by precipitation and washing with alcohol and weighing the residue. The resulting latex can be coagulated into films, sheets or threads.

The following table shows the effect of the use of aqueous solutions of water soluble salts of various polyhydric alcohol-polybasic acid resins as emulsifying agents upon the tensile strength, elongation at break, and tear resistance of the resulting film. The improved properties of films laid down from these new emulsions of chloroprene, as compared with films resulting from emulsions prepared in the usual manner from the conventional soaps, will be apparent. Items 2 and 7 of the table are a direct comparison involving films laid down from the emulsion of Example I.

| No. | Emulsifying medium | Material | | | Film properties | | |
|---|---|---|---|---|---|---|---|
| | | Amount | Emulsified | Amount | Tensile* strength | Elong.** at break | Tear resistance |
| 1 | 2% solution of ammonium salt of a 25% castor oil modified glyceryl phthalate resin. | 50 g. | Chloroprene | 50 g. | 2700 | 940 | Good. |
| 2 | 2% solution of ammonium salt of unmodified glyceryl phthalate resin. | 100 g. | do. | 100 g. | 2725 | 860 | Do. |
| 3 | 2% solution of ammonium salt of a 35% stearin modified glyceryl phthalate resin. | 100 g. | do. | 100 g. | 3000 | 1200 | Do. |
| 4 | 2% solution of sodium salt of a 35% stearin modified glyceryl phthalate resin. | 100 g. | do. | 100 g. | 2375 | 850 | Fair. |
| 5 | 2% solution of sodium salt of a 20% cottonseed oil modified glyceryl phthalate resin. | 100 g. | do. | 100 g. | 1800 | 780 | Do. |
| 6 | 2% solution of sodium salt of a 25% China-wood oil modified glyceryl phthalate resin. | 100 g. | do. | 100 g. | 2550 | 1040 | Good. |
| 7 | 2% solution of sodium oleate | 50 g. | do. | 50 g. | 1810 | 760 | Poor. |
| 8 | 3% solution of sodium oleate | 50 g. | do. | 50 g. | 1750 | 770 | Do. |
| 9 | 4% solution of sodium oleate | 50 g. | do. | 50 g. | 1800 | 650 | Do. |

*Lb./sq. in.
**Per cent increase in length to breaking point.

So far as we are aware, water solutions of polyhydric alcohol-polybasic acid resins are highly advantageous and useful for preparing aqueous emulsions of any substantially water-immiscible liquid. They can also be used for preparing aqueous dispersions of molten resins, waxes, pitches, and asphalts which melt under 100° C. and the emulsification can even be carried out successfully under pressure with those melting above the boiling point of water. The emulsifiable bodies used in the practice of our invention are in general those materials which boil above 20° C. and melt below the critical temperature of water, 360° C. It is preferable, however, that the bodies melt below 100° C. As examples of suitable liquids or other materials, the following may be mentioned: aliphatic and aromatic naphthas in general; tricresyl phosphate; di-butyl phthalate; ethoxyethyl phthalate; liquid organic bromides and chlorides (such as those obtainable by chlorination of petroleum hydrocarbons); paraffin, Japan, and Carnauba wax; tars, pitches, and asphalts; deaggregated rubber; the lower-melting fossil gums and synthetic resins; oily materials such as liquid paraffin, petroleum lubricating oils, "Russian oil", linseed oil, soya bean oil, fish oils, olive oil, castor oil, and China-wood oil; and finally, solutions in organic water-immiscible solvents of waxes, tars, and pitches, of cellulose derivatives such as nitrocellulose, ethyl cellulose, cellulose butyrate, cellulose acetate, and benzyl cellulose, and of the higher-melting natural and synthetic resins such as ester gum, Kauri, styrene resins, vinyl resins, amine-aldehyde resins, coumarone-indene resins, polyhydric alcohol-polybasic acid resins, phenol-aldehyde resins, etc. There are a few obvious limitations to the type of liquid or other substance to be emulsified. This liquid should not readily undergo hydrolysis to water-soluble products, and it should be substantially neutral for reasons of stability of the emulsion. The advantages of the new emulsifying agents and of the emulsions produced, however, are more evident in the case of oily liquids such as mineral and vegetable oils and most apparent in the case of unsaturated hydrocarbons such as butadienes, bromoprene and in particular chloroprene, which polymerize to rubber-like products. The following example is a further illustration.

*Example II*

To 100 parts of liquid paraffin ("Russian oil") is added 100 parts of a 3% aqueous solution of the triethanolamine salt of a high acid number resin prepared from the following ingredients by heating together in the manner given in Example I, or to an acid number of 70-80.

| | |
|---|---|
| Glycerol | 17.01 |
| Phthalic anhydride | 25.15 |
| Stearic acid | 57.84 |
| | 100.00 |

The aqueous solution was prepared by neutralizing with a dilute aqueous solution of triethanolamine. This mixture of oil and water solution of resin results in a highly stable emulsion after being passed through a colloid mill or stirred for five minutes with a high speed stirrer.

The resins which form our emulsifying agents may be made from any of the polyhydric alcohols and polybasic acids known in the art of manufacturing resins of this type. These include alcohols such as glycerol; ethylene glycol and higher glycols such as propylene and butylene glycols; polyglycerols; polyglycols such as diethylene and triethylene glycols; pentaerythritol; mannitol; ethers of polyhydric alcohols still containing at least two alcohol groups, such as glycerol monobenzyl ether, monoethylin, and the diethyl ether of pentaerythritol. Likewise, acids such as phthalic, succinic, adipic, sebacic, naphthalic, diphenic, quinolinic, hexahydrophthalic, citric, malic, tricarballylic, and maleic, or mixtures thereof, may be used. Oxalic and malonic are not generally suitable since they tend to decompose. The usual modifying agents such as drying oil acids, rosin and monobasic acids in general, as well as monohydric alcohols such as butyl, benzyl, ethoxyethyl, and cyclohexyl, etc., may be used as additional resin ingredients. The water soluble salts of the resins may be made with such bases as sodium, potassium, and ammonium hydroxides or with organic amines such as diethyl, monomethyl, tributyl, dimethyl, ethylpropyl, tri-ethanol- and diethanolamines.

The main requirement in making the aqueous solutions of the resins is that polymerization proceed far enough to build up the molecular weight but not far enough to prevent forming a soluble salt with the water soluble base.

The marked advantages of forming emulsions of chloroprene with the agents disclosed herein rather than with sodium oleate which is representative of the emulsifying agents commonly used, are shown in the table given above. The tensile strength and tear resistance are definitely superior, being most marked when about 1-5% of our emulsifying agent is present. The optimum appears to be close to 2%. The elongation at break still shows improvement when the latex contains amounts of the agent large enough to make its diluting effect apparent in lowered values for tensile strength and tear resistance.

As many apparently widely different embodiments of this invention may be made without departing from the spirit and scope thereof, it is to be understood that we do not limit ourselves to the specific embodiments thereof except as defined in the following claims.

We claim:

1. A process for preparing emulsions which comprises agitating water and a liquid substantially immiscible therewith with a water-soluble salt of a poly-hydric alcohol-polycarboxylic acid resin.

2. A process for preparing emulsions which comprises agitating a liquid substantially immiscible with water with an aqueous solution of a water-soluble salt of a polyhydric alcohol-polycarboxylic acid resin.

3. A process for preparing a stable latex which comprises agitating chloroprene and an aqueous solution of a water-soluble salt of a polyhydric alcohol-polycarboxylic acid resin.

4. The process set forth in claim 3 in which the salt of the resin is present in an amount of 1-5% by weight of the chloroprene.

5. A process for preparing emulsions which comprises agitating water and a liquefiable organic body substantially insoluble therein with an aqueous solution of a water-soluble salt of a polyhydric alcohol-polycarboxylic acid resin.

6. A process for preparing emulsions which comprises agitating water and a substantially neutral liquefiable organic body substantially insoluble therein with an aqueous solution of a water-soluble salt of a polyhydric alcohol-polycarboxylic acid resin.

7. A composition of matter comprising an emulsion of chloroprene with water containing a water-soluble salt of polyhydric alcohol-polycarboxylic acid resin.

8. An aqueous emulsion of a substantially water-immiscible organic liquid having as an emulsifying agent a water-soluble salt of a polyhydric alcohol-polycarboxylic acid resin.

9. An aqueous emulsion of a liquefiable substantially water insoluble organic body having as an emulsifying agent a water-soluble salt of a polyhydric alcohol-polycarboxylic acid resin.

10. The process set forth in claim 3 in which the water-soluble salt is the ammonium salt of polyhydric alcohol-polycarboxylic acid resin.

11. The process set forth in claim 3 in which the water-soluble salt is the ammonium salt of polyhydric alcohol-polycarboxylic acid resin containing in combined form a modifying agent selected from the class consisting of castor oil and stearic acid.

12. The composition set forth in claim 7 in which the water-soluble salt is the ammonium salt of polyhydric alcohol-polycarboxylic acid resin.

13. The composition set forth in claim 7 in which the water-soluble salt is the ammonium salt of polyhydric alcohol-polycarboxylic acid resin containing in combined form a modifying agent selected from the class consisting of castor oil and stearic acid.

14. The composition set forth in claim 8 in which the water-soluble salt is the ammonium salt of polyhydric alcohol-polycarboxylic acid resin.

15. The composition set forth in claim 8 in which the water-soluble salt is the ammonium salt of polyhydric alcohol-polycarboxylic acid resin containing in combined form a modifying agent selected from the class consisting of castor oil and stearic acid.

GEORGE LOWRANCE DOROUGH.
HAROLD JAMES BARRETT.